United States Patent
Noh et al.

(10) Patent No.: US 8,787,289 B2
(45) Date of Patent: Jul. 22, 2014

(54) APERIODIC TRANSMISSION METHOD AND APPARATUS FOR SOUNDING REFERENCE SIGNAL IN WIRELESS COMMUNICATION SYSTEM

(75) Inventors: Min Seok Noh, Anyang-si (KR); Seung Hee Han, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 13/509,486

(22) PCT Filed: Mar. 7, 2011

(86) PCT No.: PCT/KR2011/001546
§ 371 (c)(1),
(2), (4) Date: May 11, 2012

(87) PCT Pub. No.: WO2011/108905
PCT Pub. Date: Sep. 9, 2011

(65) Prior Publication Data
US 2012/0263129 A1    Oct. 18, 2012

Related U.S. Application Data

(60) Provisional application No. 61/310,712, filed on Mar. 5, 2010.

(30) Foreign Application Priority Data

Mar. 4, 2011  (KR) ................. 10-2011-0019404

(51) Int. Cl.
*H04W 4/00* (2009.01)
*H04L 25/02* (2006.01)
*H04W 48/12* (2009.01)

(52) U.S. Cl.
CPC .......... *H04L 25/0224* (2013.01); *H04W 48/12* (2013.01)
USPC ....................................... 370/329

(58) Field of Classification Search
CPC ... H04L 25/0224; H04W 48/12; H04W 52/14
See application file for complete search history.

(56) References Cited

U.S. PATENT DOCUMENTS 8,488,538 B2 * 7/2013 Ahn et al. .................. 370/329
2008/0039098 A1  2/2008 Papasakellariou et al.
(Continued)

FOREIGN PATENT DOCUMENTS

| JP | 2012-204999 A | 10/2012 |
| WO | WO 2010/107880 A2 | 9/2010 |
| WO | WO 2011/100466 A2 | 8/2011 |

OTHER PUBLICATIONS

Alcatel-Lucent Shanghai Bell et al., "Configuration for Dynamic Aperiodic SRS Triggering", 3GPP TSG RAN WG1 Meeting #63, R1-105995, Jacksonville, USA, Nov. 15-19, 2010, 5 pages, XP050468191.

(Continued)

*Primary Examiner* — Phuc Tran
(74) *Attorney, Agent, or Firm* — Birch, Stewart, Kolasch & Birch, LLP

(57) ABSTRACT

Provided are a method and an apparatus for an aperiodic transmission of a sounding reference signal (SRS), which is performed by a user equipment (UE), in a wireless communication system. The UE aperiodically transmits an SRS through a certain uplink (UL) component carrier (CC) of a plurality of UL CCs. The certain UL CC is identical to the UL CC that transmits a physical uplink shared channel (PUSCH), which is scheduled by an uplink grant, wherein the uplink grant contains a message that triggers the aperiodic transmission of an SRS.

13 Claims, 11 Drawing Sheets

(56) References Cited

U.S. PATENT DOCUMENTS

| | | | |
|---|---|---|---|
| 2008/0200203 A1* | 8/2008 | Malladi et al. | 455/522 |
| 2009/0046645 A1* | 2/2009 | Bertrand et al. | 370/329 |
| 2009/0109908 A1* | 4/2009 | Bertrand et al. | 370/329 |
| 2009/0181691 A1 | 7/2009 | Kotecha et al. | |
| 2010/0067613 A1 | 3/2010 | Park et al. | |
| 2010/0080187 A1* | 4/2010 | Papasakellariou et al. | 370/329 |
| 2010/0226326 A1* | 9/2010 | Ahn et al. | 370/329 |
| 2011/0032895 A1* | 2/2011 | Englund et al. | 370/329 |
| 2011/0158188 A1* | 6/2011 | Womack et al. | 370/329 |
| 2012/0252474 A1* | 10/2012 | Tiirola et al. | 455/450 |
| 2013/0153298 A1* | 6/2013 | Pietraski et al. | 175/45 |

OTHER PUBLICATIONS

Ericsson et al., "Further Discussions on SRS Enhancements", 3GPP TSG-RAN WG1 #60, R1-100860, San Fransisco, USA, Feb. 22-26, 2010, 3 pages, XP050418466.

Huawei, "Issues on Cross-Carrier PDCCH Indication for Carrier Aggregation", 3GPP TSG RAN WG1 Meeting #58bis, R1-093837, Miyazaki, Japan, Oct. 12-16, 2009, 3 pages, XP050388344.

Samsung, "SRS Enhancements in Rel-10", 3GPP TSG RAN WG1 #60, R1-101189, San Fransisco, USA, Feb. 22-26, 2010, 4 pages, XP050418718.

Motorola, "Views on SRS Enhancements for LTE-A", 3GPP TSG RAN WG1 Meeting #60, R1-101134, San Francisco, USA, Feb. 22-26, 2010, pp. 1-4.

Nokia Corporation et al., "Discussion on UL CC activation and deactivation", 3GPP TSG-RAN WG2 Meeting #69, R2-101210, San Francisco, USA, Feb. 22-26, 2010, 2 pages.

NTT DOCOMO, "Views on SRS Enhancement for LTE-Advanced", 3GPP TSG RAN WG1 Meeting #60, R1-101224, San Francisco, USA, Feb. 22-26, 2010, pp. 1-8.

Samsung, "SRS Enhancements in Rel-10", 3GPP TSG RAN WG1 #60, R1-101189, San Francisco, USA, Feb. 22-26, 2010, pp. 1-4.

Samsung, "SRS Transmission Issues in LTE-A", 3GPP TSG RAN WG1 #57bis, R1-092677, Los Angeles, USA, Jun. 29-Jul. 3, 2009, pp. 1-3.

Texas Instruments, "Considerations on Aperiodic SRS", 3GPP TSG RAN WG1 #60, R1-101094, San Francisco, USA, Feb. 22-26, 2010, pp. 1-5.

Motorola Mobility, "On remaining details of aperiodic SRS triggering", 3GPP TSG RAN WG1 Meeting #63bis, R1-110299, Jan. 17-21, 2011, 4 pages.

* cited by examiner

APERIODIC TRANSMISSION METHOD AND APPARATUS FOR SOUNDING REFERENCE SIGNAL IN WIRELESS COMMUNICATION SYSTEM This application is the National Phase of PCT/KR2011/001546 filed on Mar. 7, 2011 which claims priority under 35 U.S.C. 119(a) to Application No. 10-2011-0019404, filed in the Republic of Korea on Mar. 4, 2011 and under 35 U.S.C. 119(e) to the Provisional Application No. 61/310,712 filed on Mar. 5, 2010, all of which are hereby expressly incorporated by reference into the present application.

BACKGROUND OF THE INVENTION

1. Field of the Invention

The present invention relates to wireless communications, and more particularly, to a method and apparatus for aperiodic sounding reference signal in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, Inter-Symbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on. An OFDM system is being considered after the $3^{rd}$ generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system. MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h}=y/p=h+n/p=h+\hat{n} \quad \text{[Equation 1]}$$

An uplink reference signal can be classified into a demodulation reference signal (DMRS) and a sounding reference signal (SRS). The DMRS is a reference signal used for channel estimation to demodulate a received signal. The DMRS can be combined with PUSCH or PUCCH transmission. The SRS is a reference signal transmitted for uplink scheduling by a user equipment to a base station. The base station estimates an uplink channel by using the received SRS, and the estimated uplink channel is used in uplink scheduling. The SRS can be transmitted periodically, or can be transmitted aperiodically by being triggered by the base station when the base station requires SRS transmission.

An aperiodic SRS transmission method has not been defined in a carrier aggregation system in which a plurality of component carriers (CCs) are defined. In particular, there is a need to determine a specific CC used for aperiodic SRS transmission among the plurality of CCs.

SUMMARY OF THE INVENTION

The present invention provides an aperiodic transmission method and apparatus for a sounding reference signal in a wireless communication system.

In an aspect, an aperiodic sounding reference signal (SRS) transmission method performed by a user equipment (UE) in a wireless communication system is provided. The method includes transmitting an aperiodic SRS through a specific uplink (UL) component carrier (CC) among a plurality of UL CCs, wherein the specific UL CC is identical to the UL CC that transmits a physical uplink shared channel (PUSCH) which is scheduled by an uplink grant, and wherein the uplink grant contains a message for triggering the aperiodic SRS transmission.

The UL CC that transmits the PUSCH may be determined based on a downlink control information (DCI) format transmitted through the uplink grant.

The UL CC that transmits the PUSCH may be indicated by a carrier indicator field (CIF) in the DCI format.

The UL CC that transmits the PUSCH may be a UL CC linked to a downlink (DL) CC that transmits the uplink grant.

A link between the DL CC and the UL CC may be determined based on system information.

The aperiodic SRS may be transmitted by being allocated to a resource used for periodic SRS transmission in the specific UL CC.

The aperiodic SRS may be transmitted by being allocated to an available whole SRS bandwidth among respective system bandwidths in the specific UL CC.

The aperiodic SRS may be transmitted by being allocated to the greatest bandwidth among SRS bandwidths determined in a UE-specific manner in the specific UL CC.

The aperiodic SRS may be transmitted by being allocated to some of the SRS bandwidths determined in a UE-specific manner in the specific UL CC.

The aperiodic SRS is transmitted through a plurality of antennas.

In another aspect, a UE in a wireless communication system is provided. The UE includes a radio frequency (RF) unit for transmitting an aperiodic SRS through a specific UL CC among a plurality of UL CCs, and a processor coupled to the RF unit, wherein the specific UL CC is identical to the UL CC that transmits a PUSCH which is scheduled by an uplink grant, and wherein the uplink grant contains a message for triggering the aperiodic SRS transmission.

According to the present invention, an uplink component carrier (CC) used for aperiodic sounding reference signal (SRS) transmission can be effectively indicated in a carrier aggregation system.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LET-A will be largely described, but the technical concept of the present invention is not meant to be limited thereto.

Figure 1:
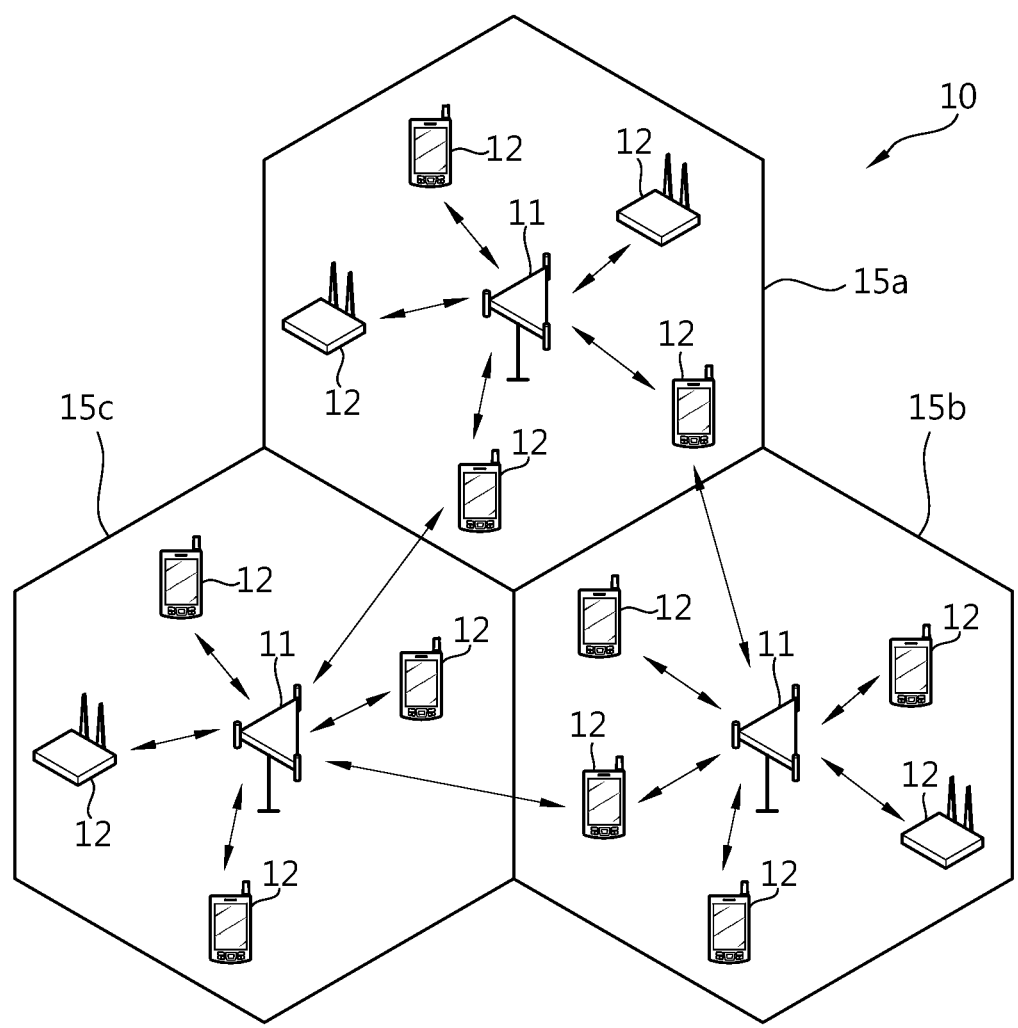
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells) Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a MIMO (Multiple-Input Multiple-Output) system, a MISO (Multiple-Input Single-Output) system, an SISO (Single-Input Single-Output) system, and an SIMO (Single-Input Multiple-Output) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
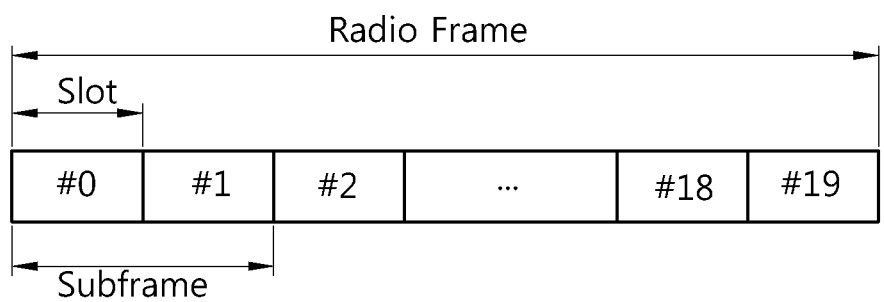
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
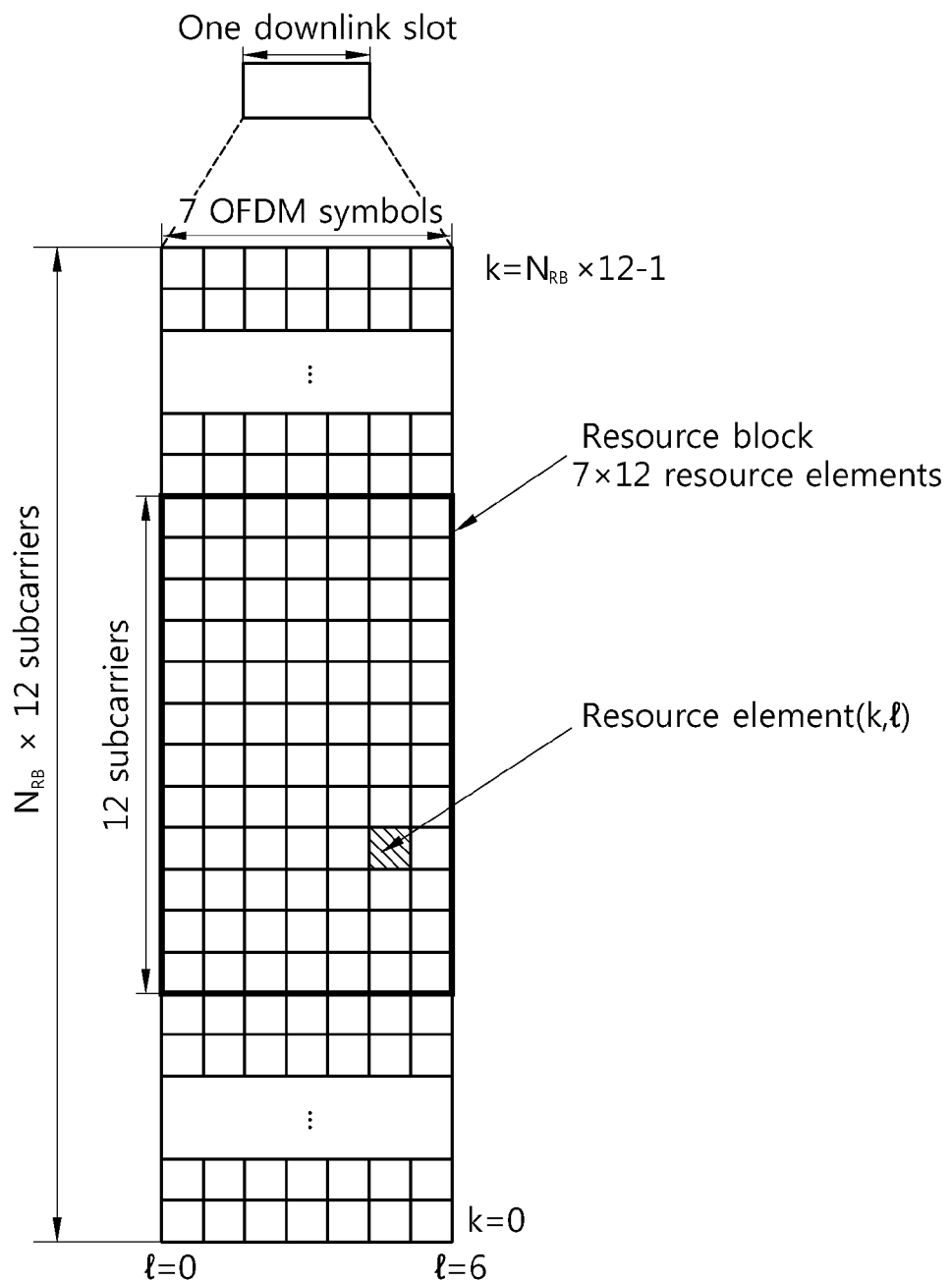
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . ,$N_{RB}$×12-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
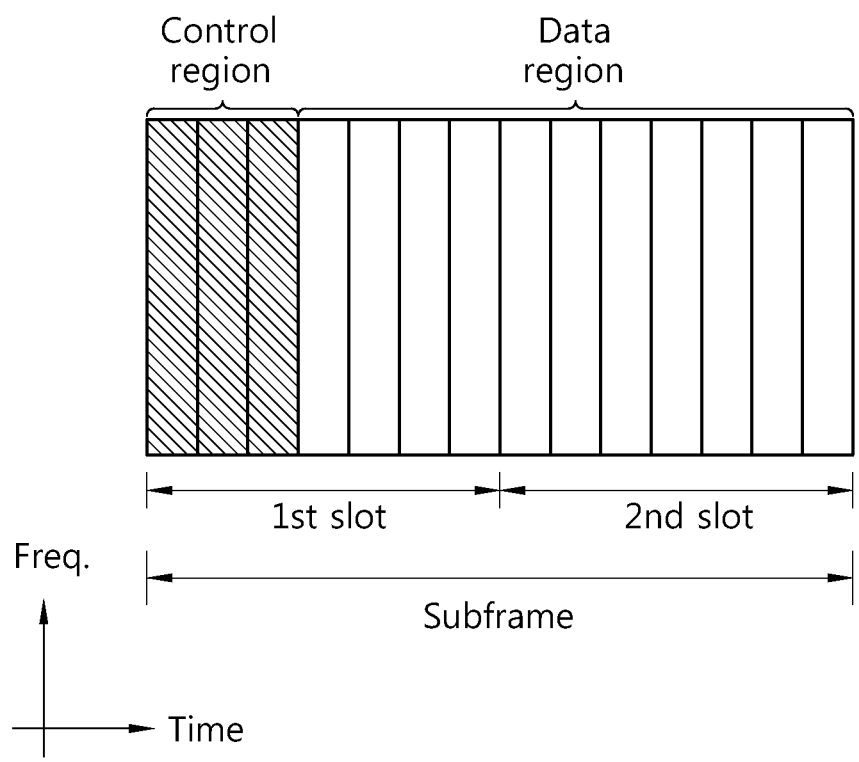
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
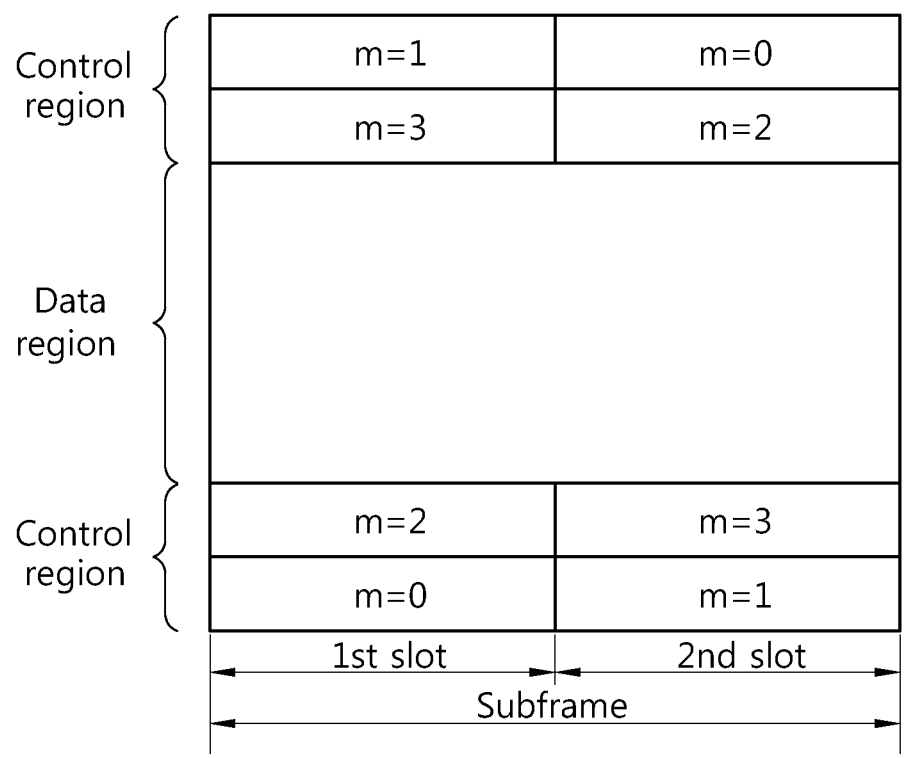
FIG. 5 shows the structure of an uplink subframe.a
FIG. 6 shows an example of a transmitter and a receiver which constitute a carrier aggregation system.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, an scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

3GPP LTE-A supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a bandwidth aggregation system or the like. The carrier aggregation system can be divided into a contiguous carrier aggregation system in which carriers are contiguous to each other and a non-contiguous carrier aggregation system in which carriers are separated from each other. In the contiguous carrier aggregation system, a guard band may exist between CCs. A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE rel-8 UE can transmit or receive only one carrier when each of carriers constituting the carrier aggregation system is compatible with an LTE rel-8 system. Therefore, when the number of carriers used in uplink is equal to the number of carriers used in downlink, it is necessary to configure such that all CCs are compatible with LTE rel-8.

In order to efficiently use the plurality of carriers, the plurality of carriers can be managed in a media access control (MAC). To transmit/receive the plurality of carriers, a transmitter and a receiver both have to be able to transmit/receive the plurality of carriers.

Figure 6:
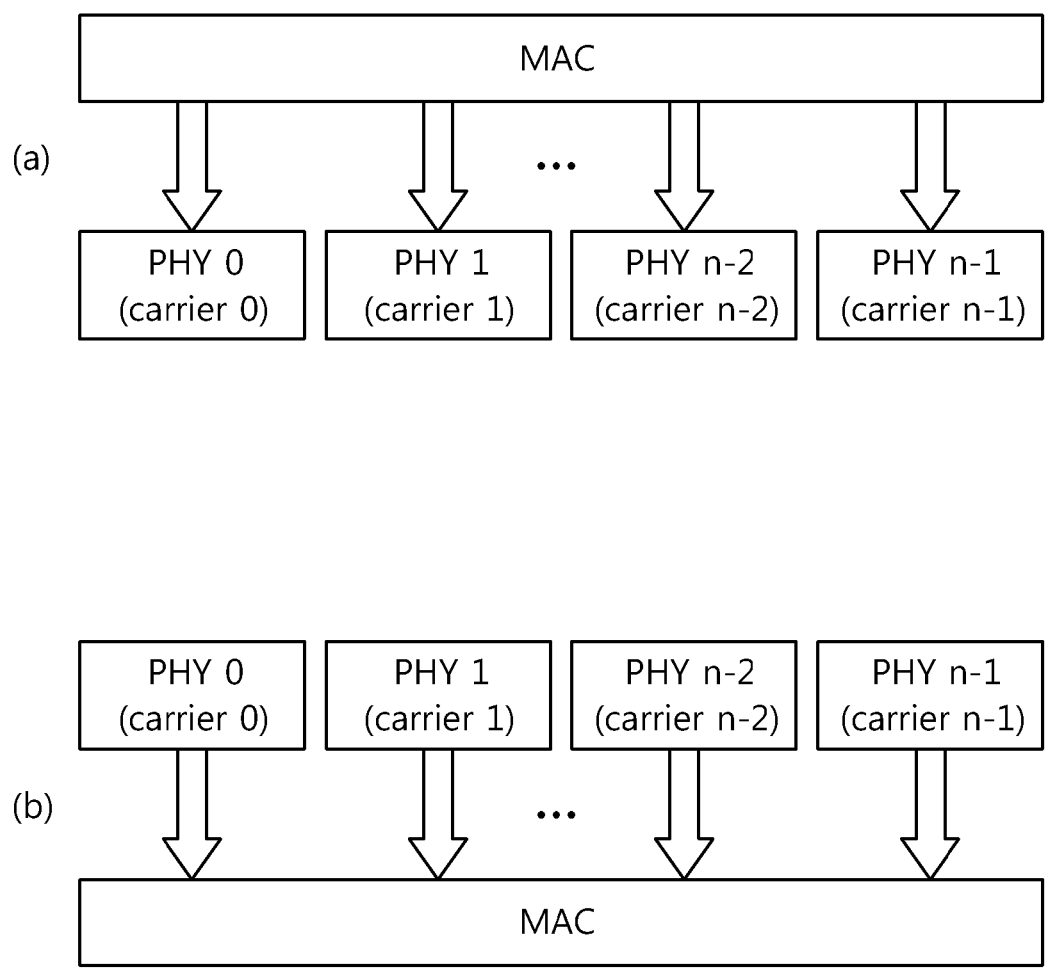

FIG. 6 shows an example of a transmitter and a receiver which constitute a carrier aggregation system.

In the transmitter of FIG. 6(a), one MAC transmits and receives data by managing and operating all of n carriers. This is also applied to the receiver of FIG. 6(b). From the perspective of the receiver, one transport block and one HARQ entity may exist per CC. A UE can be scheduled simultaneously for a plurality of CCs. The carrier aggregation system of FIG. 6 can apply both to a contiguous carrier aggregation system and a non-contiguous carrier aggregation system. The respective carriers managed by one MAC do not have to be contiguous to each other, which results in flexibility in terms of resource management.

Figure 7:
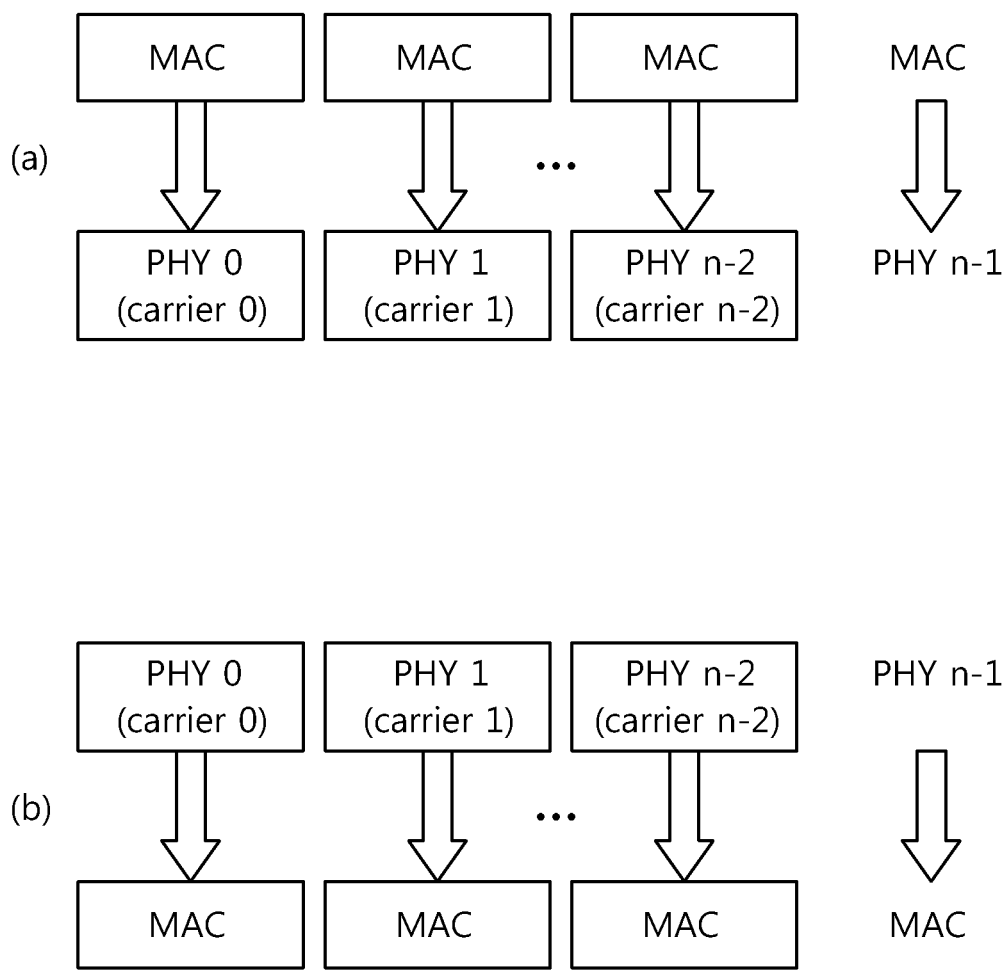
FIG. 7 and FIG. 8 are other examples of a transmitter and a receiver which constitute a carrier aggregation system.
Figure 8:
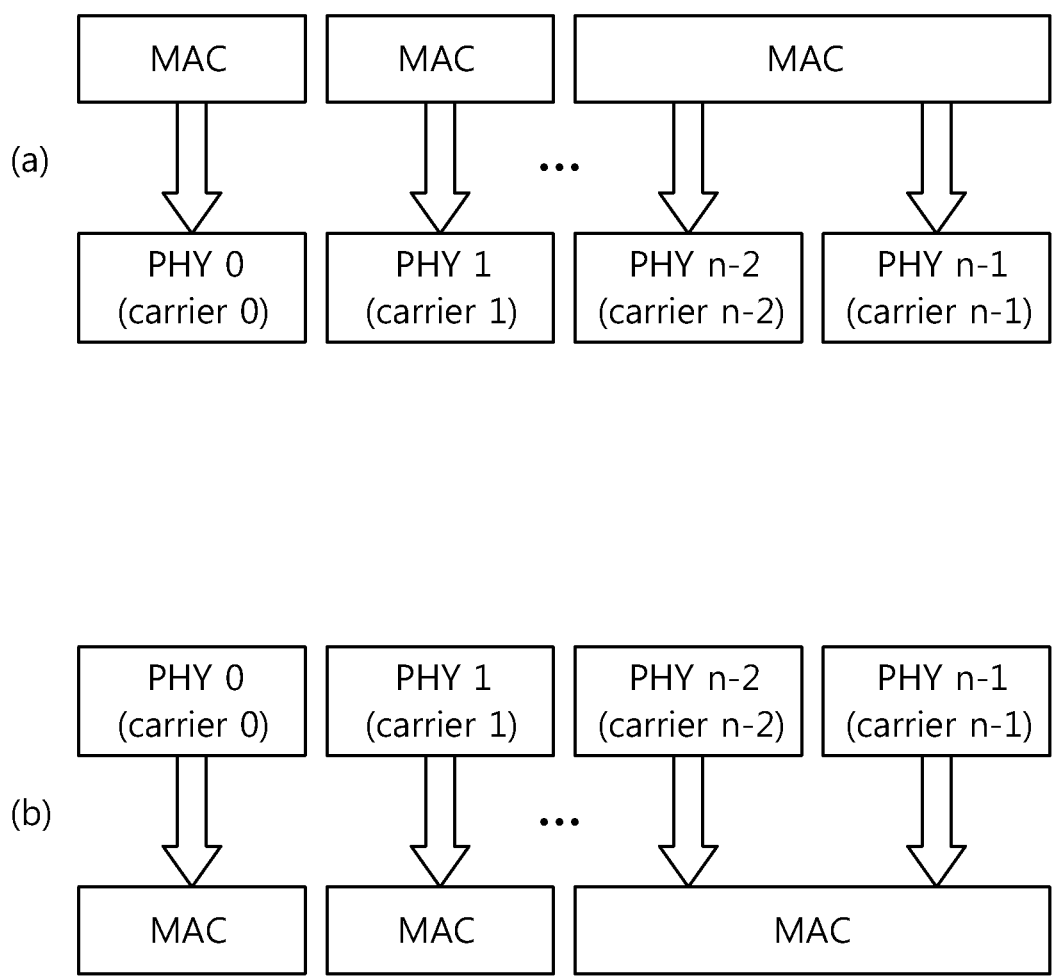

FIG. 7 and FIG. 8 are other examples of a transmitter and a receiver which constitute a carrier aggregation system.

In the transmitter of FIG. 7(a) and the receiver of FIG. 7(b), one MAC manages only one carrier. That is, the MAC and the carrier are 1:1 mapped. In the transmitter of FIG. 8(a) and the receiver of FIG. 8(b), a MAC and a carrier are 1:1 mapped for some carriers, and regarding the remaining carriers, one MAC controls a plurality of CCs. That is, various combinations are possible based on a mapping relation between the MAC and the carrier.

The carrier aggregation system of FIG. 6 to FIG. 8 includes n carriers. The respective carriers may be contiguous to each other or may be separated from each other. The carrier aggregation system can apply both to uplink and downlink transmissions. In a TDD system, each carrier is configured to be able to perform uplink transmission and downlink transmission. In an FDD system, a plurality of CCs can be used by dividing them for an uplink usage and a downlink usage. In a typical TDD system, the number of CCs used in uplink transmission is equal to that used in downlink transmission, and each carrier has the same bandwidth. The FDD system can configure an asymmetric carrier aggregation system by allowing the number of carriers and the bandwidth to be different between uplink and downlink transmissions.

Figure 9:
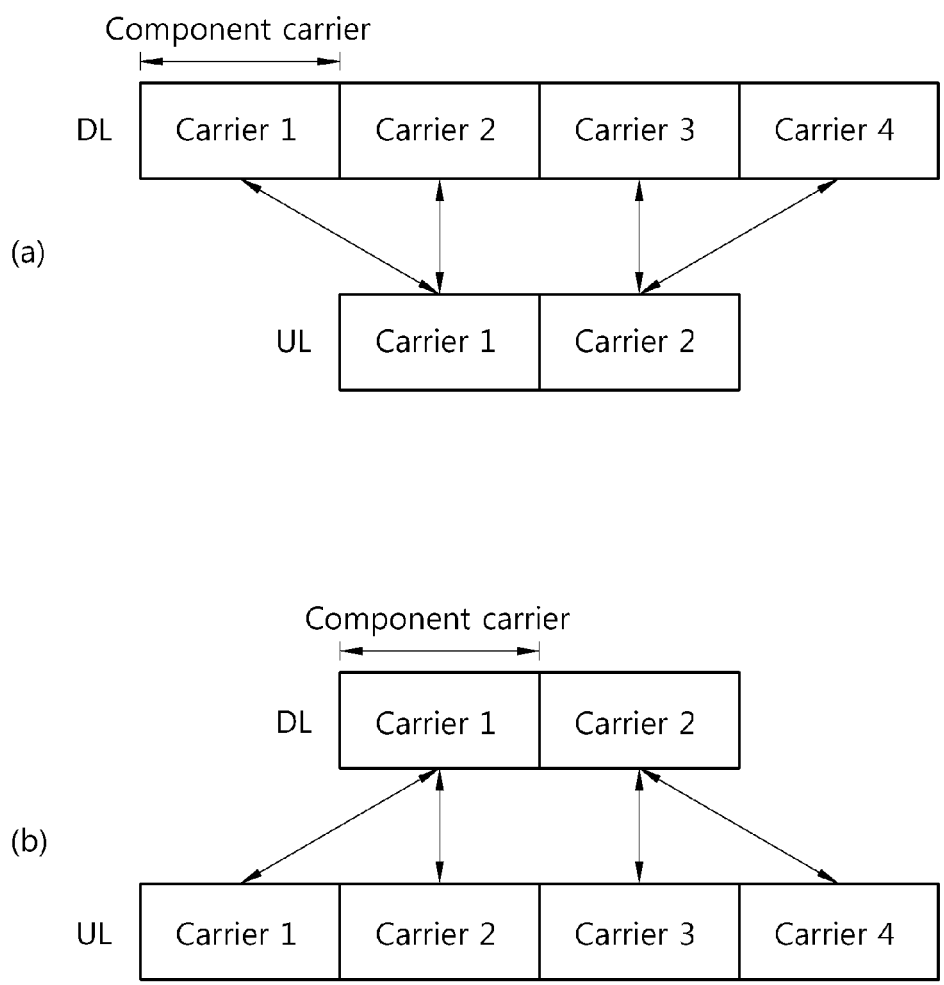
FIG. 9 shows an example of an asymmetric carrier aggregation system.

FIG. 9 shows an example of an asymmetric carrier aggregation system.

FIG. 9(a) shows an example of a carrier aggregation system in which the number of downlink CCs is greater than the number of uplink CCs. Downlink CCs #1 and #2 are linked to an uplink CC #1. Downlink CCs #3 and #4 are linked to an uplink CC #2. FIG. 9(b) shows an example of a carrier aggregation system in which the number of downlink CCs is greater than the number of uplink CCs. A downlink CC #1 is linked to uplink CCs #1 and #2. A downlink CC #2 is linked to uplink CCs #3 and #4. Meanwhile, one transport block and one HARQ entity exist per CC which is scheduled from the perspective of a UE. Each transport block is mapped to only one CC. The UE can be mapped simultaneously to a plurality of CCs.

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a Gold sequence, a Kasami sequence, etc. In addition, the RS sequence may be a cyclically shifted sequence.

The uplink RS can be classified into a demodulation reference signal (DMRS) and a sounding reference signal (SRS). The DMRS is an RS used for channel estimation to demodulate a received signal. The DMRS can be combined with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not combined with PUSCH or PUCCH transmission. The same type of base sequences can be used for the DMRS and the SRS. Meanwhile, precoding applied to the DMRS in uplink multi-antenna transmission may be the same as precoding applied to the PUSCH. Cyclic shift separation is a primary scheme for multiplexing the DMRS. In an LTE-A system, the SRS may not be precoded, and may be an antenna-specific RS.

The SRS is an RS transmitted by a relay station to the BS and is an RS which is not related to uplink data or control signal transmission. In general, the SRS may be used for channel quality estimation for frequency selective scheduling in uplink or may be used for other usages. For example, the SRS may be used in power control, initial MCS selection, initial power control for data transmission, etc. In general, the SRS is transmitted in a last SC-FDMA symbol of one subframe.

An SRS sequence is defined as $r_{SRS}(n)=r_{u,v}^{(\alpha)}(n)$. An RS sequence $r_{u,v}^{(\alpha)}(n)$ can be defined based on a base sequence $b_{u,v}(n)$ and a cyclic shift $\alpha$ according to Equation 2.

$$r_{u,v}^{(\alpha)}(n)=e^{j\alpha n}b_{u,v}(n), \quad 0 \leq n < M_{SC}^{RS} \quad \text{[Equation 2]}$$

In Equation 2, $M_{sc}^{RS}$ ($1 \leq m \leq N_{RB}^{max,UL}$) denotes an RS sequence length, where $M_{sc}^{RS}=m \cdot N_{sc}^{RB}$. $N_{sc}^{RB}$ denotes a size of a resource block represented by the number of subcarriers in a frequency domain. $N_{RB}^{max,UL}$ denotes a maximum value of an uplink bandwidth expressed by a multiple of $N_{sc}^{RB}$. A plurality of RS sequences can be defined by differently applying a cyclic shift value $\alpha$ from one base sequence.

The base sequence is divided into a plurality of groups. In this case, $u \in \{0,1,\ldots,29\}$ denotes a group index, and v denotes a base sequence index in a group. The base sequence depends on a base sequence length $M_{sc}^{RS}$. Each group includes one base sequence (i.e., v=0) having a length of $M_{sc}^{RS}$ with respect to m (where $1 \leq m \leq 5$), and includes two base sequences (i.e., v=0,1) having a length of $M_{sc}^{RS}$ with respect to m (where $6 \leq m \leq n_{RB}^{max,UL}$). The sequence group index u and the base sequence index v may vary over time similarly to group hopping or sequence hopping to be described below.

In the SRS sequence, u denotes a PUCCH sequence group index, and v denotes a base sequence index. A cyclic shift value $\alpha$ is defined by Equation 3.

$$\alpha = 2\pi \frac{n_{SRS}^{cs}}{8} \quad \text{[Equation 3]}$$

$n_{SRS}^{cs}$ denotes a value configured by a higher layer with respect to each UE, and may be any one integer in the range of 0 to 7.

The SRS sequence is mapped to a resource element by multiplying an amplitude scaling factor $\beta_{SRS}$ to satisfy transmission power $P_{SRS}$. The SRS sequence may be mapped to a resource element (k,l) starting from $r_{SRS}(0)$ according to Equation 4.

$$a_{2k+k_0,l} = \begin{cases} \beta_{SRS} r^{SRS}(k) & k=0,1,\ldots,M_{sc,b}^{RS}-1 \\ 0 & \text{otherwise} \end{cases} \quad \text{[Equation 4]}$$

In Equation 4, $k_0$ denotes a starting position in a frequency domain of the SRS, and $M_{sc,b}^{RS}$ denotes an SRS sequence length defined by Equation 5.

$$M_{sc,b}^{RS}=m_{SRS,b}N_{sc}^{RB}/2 \quad \text{[Equation 5]}$$

In Equation 5, $m_{SRS,b}$ can be given by Table 1 to Table 4 to be described below with respect to each uplink bandwidth $N_{RB}^{UL}$.

$k_0$ of Equation 4 can be defined by Equation 6.

$$k_0 = k_0' + \sum_{b=0}^{B_{SRS}} 2M_{sc,b}^{RS}n_b \quad \text{[Equation 6]}$$

In Equation 6, $k_0'$ is defined as $k_0'=(\lfloor N_{RB}^{UL}/2 \rfloor - m_{SRS,0}/2)N_{SC}^{RB}+k_{TC}$ in a normal uplink subframe. $k_{TC} \in \{0,1\}$ denotes a parameter given to a UE by a higher layer, and nb denotes a frequency position index.

Frequency hopping of the SRS is configured by a parameter $b_{hop} \in \{0,1,2,3\}$ given by the higher layer. If the frequency hopping of the SRS is not possible (i.e., $b_{hop} \geq B_{SRS}$), it is determined as a constant of the frequency position index $n_b = \lfloor 4n_{RRC}/m_{SRS,b} \rfloor \mod N_b$, and $n_{RRC}$ is given by the higher layer. If the frequency hopping of the SRS is possible (i.e., $b_{hop} < B_{SRS}$), the frequency position index $n_b$ can be determined by Equation 7.

[Equation 7]

$$n_b = \begin{cases} \lfloor 4n_{RRC}/m_{SRS,b} \rfloor \mod N_b & b \leq b_{hop} \\ \{F_b(n_{SRS}) + \lfloor 4n_{RRC}/m_{SRS,b} \rfloor\} \mod N_b & \text{otherwise} \end{cases}$$

$N_b$ can be determined by Table 1 to Table 4 to be described below, and $F_b(n_{SRS})$ can be determined by Equation 8.

[Equation 8]

$$F_b(n_{SRS}) = \begin{cases} (N_b/2)\left\lfloor \frac{n_{SRS} \mod \prod_{b'=b_{hop}}^{b} N_{b'}}{\prod_{b'=b_{hop}}^{b-1} N_{b'}} \right\rfloor + \left\lfloor \frac{n_{SRS} \mod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

In Equation 8, $n_{SRS}$ denotes the number of times of performing UE-specific SRS transmission, and can be determined by Equation 9.

[Equation 9]

$$n_{SRS} = \begin{cases} 2N_{SP}n_f + 2(N_{SP}-1)\left\lfloor \frac{n_s}{10} \right\rfloor + \left\lfloor \frac{T_{offset}}{T_{offset\_max}} \right\rfloor, & \text{for 2ms SRS periodicity} \\ & \text{of frame structure 2} \\ \lfloor (n_f \times 10 + \lfloor n_s/2 \rfloor)/T_{SRS} \rfloor, & \text{otherwise} \end{cases}$$

In Equation 9, $T_{SRS}$ denotes a UE-specific periodicity of SRS transmission, $T_{offset}$ denotes an SRS subframe offset, and $T_{offset\_max}$ denotes a maximum value of the value $T_{offset}$ for specific configuration of the SRS subframe offset. $T_{SRS}$ and $T_{offset}$ can be given by Table 7 and Table 8 to be described below.

Table 1 to Table 4 show one example of SRS bandwidth configuration. A 3-bit cell-specific parameter can be broadcast to indicate one bandwidth configuration among 8 bandwidth configurations. In addition, a 2-bit UE-specific parameter can be given from a higher layer to indicate one bandwidth configuration among 4 bandwidth configurations.

Table 1 shows an example of $m_{SRS,b}$ and $N_b$ (where, b=0, 1,2,3) when an uplink bandwidth $N_{RB}^{UL}$ is in the range of $6 \leq N_{RB}^{UL} \leq 40$.

TABLE 1

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 2 shows an example of $m_{SRS,b}$ and $N_b$ (where, b=0, 1,2,3) when the uplink bandwidth $N_{RB}^{UL}$ is in the range of $40 \leq N_{RB}^{UL} \leq 60$.

TABLE 2

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 3 shows an example of $m_{SRS,b}$ and $N_b$ (where, b=0, 1,2,3) when the uplink bandwidth $N_{RB}^{UL}$ is in the range of $60 \leq N_{RB}^{UL} \leq 80$.

TABLE 3

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 4 shows an example of $M_{SRS,b}$ and $N_b$ (where, b=0, 1,2,3) when the uplink bandwidth $N_{RB}^{UL}$ is in the range of $80 \leq N_{RB}^{UL} \leq 110$.

TABLE 4

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Table 1 to Table 4, a cell-specific parameter $C_{SRS} \in \{0,1,2,3,4,5,6,7\}$ and a UE-specific parameter $B_{SRS} \in \{0,1,2,3\}$ are given by a higher layer.

Table 5 and Table 6 show one example of a cell-specific subframe configuration period parameter $T_{SFC}$ and a cell-specific subframe offset parameter $\Delta_{SFC}$ for SRS transmission.

Table 5 shows one example of SRS subframe configuration in an FDD system. According to Table 5, the SRS subframe configuration can be indicted by a parameter having a length of 4 bits, and the periodicity of the SRS subframe may be any one of 1, 2, 5, and 10 subframes.

TABLE 5

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |

TABLE 5-continued

| srsSubframeConfiguration | Binary | Configuration Period $T_{SFC}$ (subframes) | Transmission offset $\Delta_{SFC}$ (subframes) |
|---|---|---|---|
| 14 | 1110 | 10 | {0, 1, 2, 3, 4, 5, 6, 8} |
| 15 | 1111 | reserved | reserved |

Table 6 shows one example of SRS subframe configuration in a TDD system.

TABLE 6

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

The following operation is performed for SRS transmission by the UE.

When the UE transmits an SRS, transmission power $P_{SRS}$ can be determined by Equation 10.

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\} \quad \text{[Equation 10]}$$

In Equation 10, i denotes a subframe index, $P_{CMAX}$ denotes a predetermined UE's transmit power, $P_{SRS\_OFFSET}$ denotes a 4-bit UE-specific parameter determined by the higher layer, $M_{SRS}$ denotes an SRS transmission bandwidth expressed by the number of resource blocks in a subframe having an index of i, and f(i) denotes a current power control regulation state for a PUSCH.

When the UE can select a transmit antenna, an index $a(n_{SRS})$ of a UE antenna for transmitting an SRS at a time $n_{SRS}$ is defined as $a(n_{SRS}) = n_{SRS} \mod 2$ with respect to a whole sounding bandwidth or a partial sounding bandwidth when frequency hopping is not possible, and can be defined by Equation 11 when frequency hopping is possible.

$$a(n_{SRS}) = \quad \text{[Equation 11]}$$
$$\begin{cases} (n_{SRS} + \lfloor n_{SRS}/2 \rfloor + \beta \cdot \lfloor n_{SRS}/K \rfloor) \mod 2 & \text{when } K \text{ is even} \\ n_{SRS} \mod 2 & \text{when } K \text{ is odd} \end{cases}$$

In Equation 11, $B_{SRS}$ denotes an SRS bandwidth, and $b_{hop}$ denotes a frequency hopping bandwidth. $N_b$ can be determined by a table predetermined by $C_{SRS}$ and $B_{SRS}$. Herein, $$K = \prod_{b'=b_{hop}}^{B_{SRS}} N_{b'}.$$

In Equation 11, β can be determined by Equation 12.

$$\beta = \begin{cases} 1 & \text{where } K \mod 4 = 0 \\ 0 & \text{otherwise} \end{cases} \quad \text{[Equation 12]}$$

When one SC-FDMA symbol exists in an uplink pilot time slot (UpPTS) in a TDD system, the SC-FDMA symbol can be used for SRS transmission. When two SC-FDMA symbols exist in the UpPTS, both of the two SC-FDMA symbols can be used for SRS transmission, and can be allocated simultaneously to one UE.

The UE does not transmit an SRS whenever SRS transmission and PUCCH format 2/2a/2b transmission are simultaneously performed in the same subframe.

If a parameter 'ackNackSRS-SimultaneousTransmission' is false, the UE does not transmit an SRS whenever SRS transmission and PUCCH transmission for carrying ACK/NACK and/or positive SR are performed in the same subframe. In addition, if the parameter 'ackNackSRS-SimultaneousTransmission' is true, when SRS transmission and PUCCH transmission for carrying ACK/NACK and/or positive SR are configured in the same subframe, the UE transmits the PUCCH for carrying the ACK/NACK and/or the positive SR simultaneously with the SRS by using a shortened PUCCH format. That is, when the PUCCH for carrying the ACK/NACK and/or the positive SR is configured in an SRS subframe which is configured in a cell-specific manner, a shortened PUCCH format is used and the PUCCH for carrying the ACK/NACK and/or the positive SR is transmitted simultaneously with the SRS. When the SRS transmission overlaps a physical random access channel (PRACH) for a preamble format 4 or exceeds a range of an uplink system bandwidth configured in a cell, the UE does not transmit the SRS.

The parameter 'ackNackSRS-SimultaneousTransmission' which is given by the higher layer determines whether the UE supports simultaneous transmission of an SRS and a PUCCH for carrying an ACK/NACK in one subframe. If the UE is configured to simultaneously transmit the SRS and the PUCCH for carrying the ACK/NACK in one subframe, the UE can transmit the ACK/NACK and the SRS in a cell-specific SRS subframe. In this case, a shortened PUCCH format can be used, and transmission of the NACK or SR corresponding to a position at which the SRS is transmitted is punctured. The shortened PUCCH format is used in a cell-specific SRS subframe even when the UE does not transmit the SRS in the subframe. If the UE is configured not to simultaneously transmit the SRS and the PUCCH for carrying the ACK/NACK in one subframe, the UE can use a normal PUCCH format 1/1a/1b for transmission of the ACK/NACK and SR.

Table 7 and Table 8 show one example of UE-specific SRS configuration for indicating an SRS transmission periodicity $T_{SRS}$ and an SRS subframe offset $T_{offset}$. The SRS transmission periodicity $T_{SRS}$ can be determined from {2, 5, 10, 20, 40, 80, 160, 320} ms.

Table 7 shows one example of SRS configuration in an FDD system.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Table 8 shows one example of SRS configuration in a TDD system.

TABLE 8

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

An SRS subframe satisfies $(10*n_f + k_{SRS} - T_{offset})$ mod $T_{SRS} = 0$ in the FDD system and, if $T_{SRS} > 2$, in the TDD system. $n_f$ denotes a frame index, and $k_{SRS}$ denotes a subframe index in a frame in the FDD system. In the TDD system, if $T_{SRS} = 2$, two SRS resources can be configured in a half-frame including at least one uplink subframe, and an SRS subframe satisfies $(k_{SRS} - T_{offset})$ mod 5 = 0.

In the TDD system, $k_{SRS}$ can be determined by Table 9.

TABLE 9

| | subframe index n | | | | | | | | | |
|---|---|---|---|---|---|---|---|---|---|---|
| | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

Meanwhile, the UE does not transmit an SRS whenever SRS transmission and PUSCH transmission corresponding to retransmission of the same transport block are performed in the same subframe as a part of random access response grant or contention-based random access procedure.

The SRS transmission method can be classified into two. As a method defined in LTE rel-8, there are a period SRS transmission method that periodically transmits an SRS according to an SRS parameter received by radio resource control (RRC) signaling and an aperiodic SRS transmission method that transmits an SRS whenever necessarily on the basis of a message dynamically triggered from a BS. The aperiodic SRS transmission method can be used in LTE-A.

Meanwhile, in the periodic SRS transmission method and the aperiodic SRS transmission method, an SRS can be transmitted in a UE-specific SRS subframe determined in a UE-specific manner. In a periodic SRS transmission method defined in LTE rel-8, a cell-specific SRS subframe is configured periodically by a cell-specific SRS parameter, and periodic SRS transmission is performed in a periodic UE-specific SRS subframe configured by a UE-specific SRS parameter among cell-specific SRS subframes. In this case, the periodic UE-specific SRS subframe may be a subset of the cell-specific subframe. The cell-specific SRS parameter can be given by a higher layer. In the aperiodic SRS transmission method, an aperiodic SRS can be transmitted in an aperiodic UE-specific SRS subframe determined by a UE-specific aperiodic SRS parameter. The aperiodic UE-specific SRS subframe of the aperiodic SRS transmission method may be a subset of the cell-specific SRS subframe as defined in the LTE rel-8. Alternatively, the aperiodic UE-specific SRS subframe may be the same as the cell-specific subframe. The UE-specific aperiodic SRS parameter may also be given by a higher layer similarly to the cell-specific SRS parameter. The UE-specific aperiodic SRS subframe can be configured by the aforementioned subframe periodicity and subframe offset of Table 7 or Table 8.

In a carrier aggregation system including a plurality of CCs, an aperiodic SRS transmission method has not been defined. That is, when a BS requests aperiodic SRS transmission to a UE by using a specific DCI format (i.e., when the BS triggers aperiodic SRS transmission), the UE requires information regarding a specific UL CC by which the UE performs sounding and information regarding a specific resource used to perform sounding.

Hereinafter, the present invention will be described according to an embodiment of the present invention.

Figure 10:
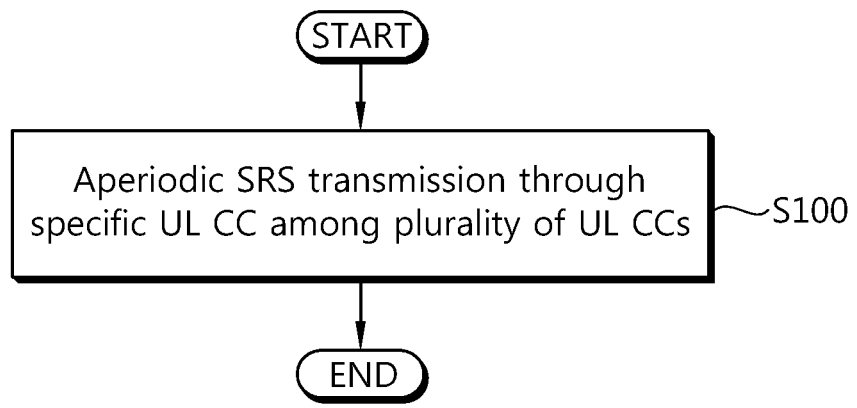
FIG. 10 shows the proposed aperiodic SRS transmission method according to an embodiment of the present invention.

FIG. 10 shows the proposed aperiodic SRS transmission method according to an embodiment of the present invention.

In step S100, a UE transmit an aperiodic SRS through a specific UL CC among a plurality of UL CCs.

When a BS triggers the aperiodic SRS transmission by using one bit, the UE can transmit the aperiodic SRS through a UL CC determined by various methods.

1) The UE can transmit the aperiodic SRS through a predetermined UL CC. In this case, the predetermined UL CC may be any one of a primary CC (PCC) or a secondary CC (SCC), and may be a CC of which the PCC and the SCC are predetermined.

2) The UE can transmit the aperiodic SRS through a UL CC determined by RRC signaling or L1/L1 control signaling. When information on the UL CC that transmits the aperiodic SRS is transmitted through the L1/L2 signaling, this can be defined in a DL DCI format or a UL DCI format. When it is defined in the DL DCI format, the aperiodic SRS can be transmitted through a UL CC indicated by a carrier indicator field (CIF). Alternatively, the UL CC can be indicated by another field.

3) The UE can transmit the aperiodic SRS through some UL CCs among configured UL CCs determined by RRC signaling. In this case, the some UL CCs that transmit the SRS may be indicated by RRC signaling or L1/L2 control signaling.

4-1) The UE can transmit the aperiodic SRS through a UL CC linked to a DL CC that transmits a UL DCI format including a message for triggering the aperiodic SRS transmission. In this case, the link between the DL CC and the UL CC can be indicated by using an SIB-2 link relation.

4-2) The UE can transmit the aperiodic SRS through a UL CC linked to a DL CC that transmits a DL DCI format including a message for triggering the aperiodic SRS transmission. In this case, the link between the DL CC and the UL CC can be indicated by using an SIB-2 link relation.

4-3) The UE can transmit the aperiodic SRS through a UL CC to which scheduling information is applied in a UL DCI format including a message for triggering the aperiodic SRS transmission. The UL CC to which the scheduling information is applied can be indicated by a CIF in the UL DCI format.

4-4) The UE can transmit the aperiodic SRS through a UL CC linked to a DL CC to which scheduling information is applied in a DL DCI format including a message for triggering the aperiodic SRS transmission. The UL CC to which the scheduling information is applied can be indicated by a CIF in the DL DCI format.

5) A UL CC that transmits the aperiodic SRS can be directly indicated by using an additional control signal field allocated dynamically or semi-dynamically.

6) The aperiodic SRS can be transmitted through a UL CC implicitly determined according to a UE state or configuration information of a transmission mode (i.e., a MIMO transmission mode or a non-contiguous RB allocation based transmission mode).

A resource for the aperiodic SRS transmission in a UL CC can be allocated in various manners.

1) As the resource for the aperiodic SRS transmission, a resource used for periodic SRS transmission can be directly used. That is, the resource can be allocated for the aperiodic SRS transmission on the basis of SRS parameters such as cell-specific SRS bandwidth configuration information, UE-specific SRS bandwidth configuration information, transmission comb information, or the like which are provided by RRC signaling or L1/L2 control signaling.

2) Irrespective of cell-specific SRS bandwidth configuration or UE-specific bandwidth configuration for the periodic SRS, an available whole band SRS bandwidth can be allocated for the aperiodic SRS transmission among respective system bandwidths defined in LTE rel-8/9. For example, for the aperiodic SRS transmission, 24 RBs, 48 RBs, 72 RBs, and 96 RBs are respectively allocated for system bandwidths 5 MHz, 10 MHz, 15 MHz, and 20 MHz. In one subframe, a time resource for the aperiodic SRS transmission may be a last SC-FDMA symbol of a subframe used for periodic SRS transmission, and the aperiodic SRS and the periodic SRS can be multiplexed in various manners.

3) Among SRS bandwidths that can be configured in a UE-specific manner in the cell-specific SRS bandwidth configuration, the greatest bandwidth can be allocated for the aperiodic SRS transmission. That is, this is a case where $B_{SRS}=0$ in Table 1 to Table 4.

4) The aperiodic SRS can be transmitted by using some bandwidths among the

SRS bandwidths that can be configured in a UE-specific manner in the cell-specific SRS bandwidth configuration. For example, the SRS bandwidth that can be configured in a UE-specific manner can be divided so as to transmit the aperiodic SRS in sequence by using each divided bandwidth. Each divided bandwidth may have the same size. Alternatively, the aperiodic SRS can be transmitted by using a bandwidth greater than a maximum value of an SRS bandwidth that can be configured in a UE-specific manner. This implies that the UE can transmit the aperiodic SRS by using an SRS bandwidth which is different from the UE-specific SRS bandwidth allocated to the UE.

5) The aperiodic SRS can be transmitted by using a newly defined SRS resource, and the SRS resource can include a resource used for DMRS transmission.

6) The aperiodic SRS can be transmitted by using a time resource based on a DCI format or a specific time resource for the aperiodic SRS in a time domain. For example, when the aperiodic SRS is triggered by the DL DCI, the aperiodic SRS can be transmitted in a UL subframe that transmits a UL control signal corresponding to the DL DCI or can be transmitted in a UE-specific aperiodic SRS subframe which is a first defined SRS resource after the UL subframe. Alternatively, when the aperiodic SRS is triggered by the UL DCI, the aperiodic SRS can be transmitted in a UL subframe to which a corresponding UL resource is allocated or can be transmitted in a UE-specific aperiodic SRS subframe which is a first defined SRS resource after the UL subframe. Alternatively, the aperiodic SRS can be transmitted according to a specific offset predetermined or indicated by another signal, or can be transmitted in a UE-specific aperiodic SRS subframe which is an SRS resource first available at that time.

The aperiodic SRS can be multiplexed to be transmitted through a plurality of antennas.

1) A periodic SRS is transmitted through multiple antennas by a repetition factor (RPF) of 2. An aperiodic SRS can also be transmitted through the multiple antennas by the RPF of 2. For this, different transmission combs can be configured, and multiplexing can be performed by using code division multiplexing (CDM) by allocating different cyclic shift values in the same transmission comb.

2) The aperiodic SRS can be transmitted through the multiple antennas by using another RPF value other than the RPF of 2.

3) Alternatively, the aperiodic SRS may not be transmitted simultaneously for all antennas while the aperiodic SRS is transmitted through a plurality of antennas. That is, in the aperiodic SRS transmission, transmission can be performed such that each of the antennas are multiplexed according to time division multiplexing (TDM) through the plurality of antennas. A resource used in this case can be transmitted by using the same resource by each antenna. For example, a resource allocated for the periodic SRS transmission can be used for the aperiodic SRS transmission.

Meanwhile, an aperiodic SRS transmitted through a specific UL CC can be transmitted simultaneously with another SRS transmitted through another UL CC. When a resource for transmitting the aperiodic SRS does not overlap with a resource for transmitting the periodic SRS, the UE can simultaneously transmit the aperiodic SRS and the periodic SRS. In this case, the UE can transmit the aperiodic SRS and the periodic SRS through a plurality of UL CCs in various manners. For example, a UL CC that transmits the aperiodic SRS may be a PCC, an anchor CC, or an SCC. Alternatively, the UL CC that transmits the aperiodic SRS may be some UL CCs among configured UL CCs determined by RRC signaling, and in this case, the some UL CCs that transmit the SRS can be indicated by RRC signaling or L1/L2 control signaling.

Alternatively, the aperiodic SRS for the plurality of UL CCs can be transmitted through only one UL CC. The aperiodic SRS can be transmitted through one UL CC by being TDM-multiplexed on a subframe basis in the configured UL CC. Alternatively, the PCC and another UL CC can be TDM-multiplexed. Alternatively, the aperiodic SRS can be transmitted by being TDM-multiplexed on a subframe basis in a UL CC linked to a DL CC that triggers aperiodic SRS transmission. Alternatively, the aperiodic SRS can be transmitted by being TDM-multiplexed on a subframe basis in all available UL CCs irrespective of a link between the DL CC and the UL CC. When transmitting the aperiodic SRS which is TDM-multiplexed, a transmission order of the aperiodic SRS can be indicated by a control signal or can be predetermined. When the aperiodic SRS transmission overlaps with periodic SRS transmission which is configured by RRC in advance, the UE can drop the periodic SRS transmission, and can perform only the aperiodic SRS transmission. In this case, the dropping of the periodic SRS transmission can be applied only when a UL CC that transmits the aperiodic SRS and a UL CC that transmits the periodic SRS are the same UL CC. Alternatively, even if the UL CC that transmits the aperiodic SRS is different from the UL CC that transmits the periodic SRS, only the aperiodic SRS transmission can be performed while dropping the periodic SRS transmission.

Figure 11:
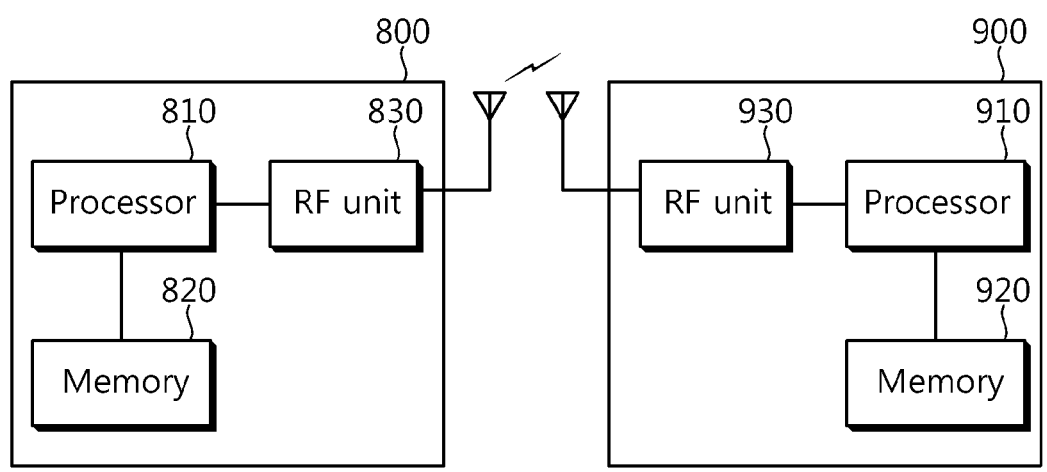
FIG. 11 is a block diagram showing a BS and a UE to implement an embodiment of the present invention.

FIG. 11 is a block diagram of a BS and a UE according to an embodiment of the present invention.

A BS 800 includes a processor 810, a memory 820, and a radio frequency (RF) unit 830. The processor 810 implements the proposed functions, procedures, and/or methods. Layers of a radio interface protocol can be implemented by the processor 810. The memory 820 coupled to the processor 810 stores a variety of information for driving the processor 810. The RF unit 830 coupled to the processor 810 transmits and/or receives a radio signal.

A UE 900 includes a processor 910, a memory 920, and an RF unit 930. The processor 910 implements the proposed functions, procedures, and/or methods. Layers of a radio interface protocol can be implemented by the processor 910. The memory 920 coupled to the processor 910 stores a variety of information for driving the processor 910. The RF unit 930 coupled to the processor 910 transmits an aperiodic SRS through a specific UL CC among a plurality of UL CCs. The specific UL CC is a UL CC which is the same as a UL CC that transmits a PUSCH scheduled by an uplink grant. The uplink grant includes a message for triggering the aperiodic SRS transmission.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting an aperiodic sounding reference signal (SRS) by a user equipment (UE) in a wireless communication system, the method comprising:
    receiving, via a physical downlink control channel (PDCCH), downlink control information (DCI) including at least a trigger for triggering the aperiodic SRS transmission; and
    upon detecting the trigger, aperiodically transmitting a SRS through a specific uplink (UL) component carrier (CC) among a plurality of aggregated UL CCs when a carrier indicator field (CIF) is also included in the DCI, wherein the specific UL CC is an UL CC identified by the CIF.

2. The method of claim 1, wherein the specific UL CC is an UL CC linked to a downlink (DL) CC in which the PDCCH is allocated.

3. The method of claim 2, wherein a link between the DL CC and the UL CC is determined based on system information.

4. The method of claim 1, wherein the step of aperiodically transmitting the SRS comprises:
    allocating the SRS to a resource used for periodic SRS transmission in the specific UL CC.

5. The method of claim 1, wherein the step of aperiodically transmitting the SRS comprises:
    allocating the SRS to an available whole SRS bandwidth among respective system bandwidths in the specific UL CC.

6. The method of claim 1, wherein the step of aperiodically transmitting the SRS comprises:
    allocating the SRS to a greatest bandwidth among SRS bandwidths determined in a UE-specific manner in the specific UL CC.

7. The method of claim 1, wherein the step of aperiodically transmitting the SRS comprises:
    allocating the SRS to a subset of SRS bandwidths determined in a UE-specific manner in the specific UL CC.

8. The method of claim 1, wherein the step of aperiodically transmitting the SRS comprises:
    aperiodically transmitting the SRS through a plurality of antennas.

9. The method of claim 1, when the carrier indicator field (CIF) is not included in the DCI, aperiodically transmitting the SRS through an uplink UL CC in which a physical uplink shared channel (PUSCH) is scheduled by the PDCCH.

10. A user equipment configured to transmit an aperiodic sounding reference signal (SRS) in a wireless communication system, the user equipment comprising:
- a radio frequency (RF) transmitter; and
- a processor coupled to the RF transmitter and configured to
  - receiving, via a physical downlink control channel (PDCCH), downlink control information (DCI) including at least a trigger for triggering the aperiodic SRS transmission, and
  - upon detecting the trigger, aperiodically transmit a SRS through a specific uplink (UL) component carrier (CC) among a plurality of aggregated UL CCs when a carrier indicator field (CIF) is also included in the DCI,
  - wherein the specific UL CC is an UL CC identified by the CIF.

11. The user equipment of claim 10, wherein the specific UL CC is an UL CC linked to a downlink (DL) CC in which the PDCCH is allocated.

12. The user equipment of claim 11, wherein a link between the DL CC and the UL CC is determined based on system information.

13. The user equipment of claim 10, wherein, when the carrier indicator field (CIF) is not included in the DCI, the processor is configured to aperiodically transmit the SRS through an uplink UL CC in which a physical uplink shared channel (PUSCH) is scheduled by the PDCCH.

* * * * *